US007662764B2

(12) United States Patent
Nagase et al.

(10) Patent No.: US 7,662,764 B2
(45) Date of Patent: Feb. 16, 2010

(54) AZEOTROPE-LIKE SOLVENT COMPOSITION AND MIXED SOLVENT COMPOSITION

(75) Inventors: Michiomi Nagase, Ichihara (JP); Masaaki Tsuzaki, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 444 days.

(21) Appl. No.: 11/692,311

(22) Filed: Mar. 28, 2007

(65) Prior Publication Data

US 2007/0173432 A1 Jul. 26, 2007

Related U.S. Application Data

(63) Continuation of application No. PCT/JP2005/018450, filed on Oct. 5, 2005.

(30) Foreign Application Priority Data

Oct. 5, 2004 (JP) .............................. 2004-292618

(51) Int. Cl.
*C09K 5/04* (2006.01)
*C11D 7/50* (2006.01)

(52) U.S. Cl. ............................ 510/177; 134/42; 252/67

(58) Field of Classification Search ................. 510/177; 252/42; 134/67
See application file for complete search history.

(56) References Cited

U.S. PATENT DOCUMENTS 4,541,943 A * 9/1985 Powell ........................ 252/67
4,828,751 A * 5/1989 Kremer ....................... 134/19
5,259,983 A * 11/1993 Van Der Puy et al. ....... 510/409
5,431,837 A 7/1995 Matsuhisa et al.
5,444,102 A * 8/1995 Nimitz et al. ............... 521/131
5,562,861 A * 10/1996 Nimitz et al. .................. 516/8
5,605,647 A * 2/1997 Nimitz et al. .................. 252/2
5,611,210 A * 3/1997 Nimitz et al. ................. 62/114
5,674,451 A * 10/1997 Nimitz et al. ................. 422/34
5,685,915 A * 11/1997 Nimitz et al. .................. 134/1
5,695,688 A * 12/1997 Nimitz et al. .................. 516/8
5,716,549 A * 2/1998 Nimitz et al. ............... 252/364
7,083,742 B1 * 8/2006 Nimitz et al. .................. 252/8
2006/0249179 A1 11/2006 Tsuzaki et al.
2007/0173432 A1 * 7/2007 Nagase et al. ............... 510/408

FOREIGN PATENT DOCUMENTS

EP 0 454 109 A1 10/1991
JP 64-60694 3/1989
JP 7-53996 2/1995
JP 10-324897 12/1998
JP 2000-7603 1/2000
JP 2003-512480 4/2003
JP 2004-75910 3/2004
JP 2004-149658 5/2004
WO WO 97/39081 10/1997
WO WO 01/16422 3/2001

* cited by examiner

*Primary Examiner*—Gregory E Webb
(74) *Attorney, Agent, or Firm*—Oblon, Spivak, McClelland, Maier & Neustadt, L.L.P.

(57) ABSTRACT

To provide a solvent composition capable of removing soils such as dusts and oils attached to the surface of an article made of an acrylic resin or an article coated with an acrylic resin, without damaging it.

An azeotrope-like solvent composition comprising from 38 to 41 mass % of (2,2,2-trifluoroethoxy)-1,1,2,2-tetrafluoroethane and from 59 to 62 mass % of perfluorohexane. A mixed solvent composition comprising from 30 to 60 mass % of (2,2,2-trifluoroethoxy)-1,1,2,2-tetrafluoroethane and from 40 to 70 mass % of perfluorohexane.

7 Claims, No Drawings

AZEOTROPE-LIKE SOLVENT COMPOSITION AND MIXED SOLVENT COMPOSITION

TECHNICAL FIELD

The present invention relates to solvent compositions to be used for removing soils such as oils and dusts attached to the surface of articles, e.g., electronic components such as IC, precision mechanical parts, glass substrates, molded-resin parts, etc.

BACKGROUND ART

Heretofore, in the precision mechanical industry, the optical instrument industry, the electrical and electronics industry and plastics industry, halogenated hydrocarbons have been known as solvents used for precision cleaning to remove soils such as oils, dusts, etc. attached to the surface of articles during manufacturing processes or the like.

However, since halogenated hydrocarbons such as chlorofluorocarbons or hydrochlorofluorocarbons have ozone depleting potential, researches to develop solvents that can substitute such halogenated hydrocarbons have recently been conducted, and hydrofluoroethers (hereinafter referred to as HFEs) are known as the solvents. HFEs have advantages such that they are inflammable, have excellent chemical and thermal stabilities, have excellent properties in drying, and have zero ozone depleting potential and low global warming potential. For example, HFE-7100 ($C_4F_9OCH_3$, trade name of 3M) and HFE-7200 ($C_4F_9OC_2H_5$, trade name of 3M) are known as HFEs.

Generally, since HFEs have low solvency to oils as compared with the halogenated hydrocarbons, there has been a problem such that HFEs are difficult to be used as cleaning agents in place of the halogenated hydrocarbons.

However, the present inventors have found that (2,2,2-trifluoroethoxy)-1,1,2,2-tetrafluoroethane which is one of HFEs, can dissolve several oils, e.g. Panasate 810 (trade name of NOF CORPORATION).

However, in a case where an article to which Panasate 810 is attached is cleaned by using (2,2,2-trifluoroethoxy)-1,1,2,2-tetrafluoroethane, if the article is comprised of an acrylic resin or coated with an acrylic resin, there have been problems such that haze or cracking occurs on the surface of the article, and dissolution of the acrylic resin occurs.

On the other hand, Patent Document 1 discloses that an azeotrope-like composition comprising (2,2,2-trifluoroethoxy)-1,1,2,2-tetrafluoroethane and an alcohol such as methanol is useful as a removing agent for e.g. flux or oil, a cleaning agent for electronic components, resin-processed parts or optical lenses, or a dewatering/drying agent.

However, since the compositions disclosed in Patent Document 1 have significant effects on several resins such as an acrylic resin, there has been a problem such that in a case where an acrylic resin or an article coated with an acrylic resin is contacted with the compositions, haze, cracking or dissolution of the acrylic resin occurs.

Further, a perfluorocarbon such as perfluorohexane is also a compound having zero ozone depleting potential, but if it is used as a cleaning agent for e.g. oil, cleaning fails because its cleaning performance is insufficient.

Patent Document 1: JP-A-10-324897 (Scope of the Claims, paragraph 0009)

DISCLOSURE OF THE INVENTION

Object of the Invention

The object of the present invention is to provide a solvent composition which is capable of removing soils such as oils attached to the surface of an article made of an acrylic resin or an article coated with an acrylic resin, without damaging it.

Means to Accomplish the Object

The present invention provides an azeotrope-like solvent composition comprising from 38 to 41 mass % of (2,2,2-trifluoroethoxy)-1,1,2,2-tetrafluoroethane and from 59 to 62 mass % of perfluorohexane. The boiling point of this azeotrope-like solvent composition at a pressure of $1.011\times10^5$ Pa is from 47 to 48° C. Here, the azeotrope-like solvent composition is defined as a mixed solvent composition having a relative volatility within a range of 1.00±0.04.

Further, the present invention provides a mixed solvent composition comprising from 30 to 60 mass % of (2,2,2-trifluoroethoxy)-1,1,2,2-tetrafluoroethane and from 40 to 70 mass % of perfluorohexane.

In the present invention, perfluorohexane indicates perfluorohexane containing n-perfluorohexane and/or is perfluoroisohexane as the main component. Here, the total content of n-perfluorohexane and perfluoroisohexane in perfluorohexane is preferably at least 90 mass %.

In this specification, (2,2,2-trifluoroethoxy)-1,1,2,2-tetrafluoroethane is hereinafter referred to as HFE-347.

EFFECTS OF THE INVENTION

The azeotrope-like solvent composition and the mixed solvent composition of the present invention have a small effect on e.g. an acrylic resin. Accordingly, in a case where these solvent compositions are used for cleaning articles made of an acrylic resin or articles coated with an acrylic resin, these articles can be cleaned without haze or cracking.

Further, the azeotrope-like solvent composition and the mixed solvent composition of the present invention can readily remove contaminants such as oils, dusts, particles and resin shavings, droplets of a solvent having a high surface tension and a small specific gravity, water droplets, etc, attached to the surface of articles to be cleaned.

BEST MODE FOR CARRYING OUT THE INVENTION

An azeotrope-like solvent composition has such an advantage that when this solvent composition is repeatedly evaporated and condensed, the solvent composition will not change, and therefore a very stable cleaning performance will be obtained. Accordingly, the azeotrope-like solvent composition of the present invention has the same advantage as above.

The azeotrope-like solvent composition of the present invention comprises solely HFE-347 and perfluorohexane. Further, the mixed solvent composition of the present invention essentially comprises HFE-347 and perfluorohexane, and may further contain another compound. The content of another compound is preferably at most 20 mass % and particularly preferably at most 10 mass %.

As such another compound, at least one compound selected from the group consisting of hydrocarbons, alcohols, ketones, halogenated hydrocarbons, ethers, esters and glycol ethers, may be mentioned. Further, fluorinated ethers are excluded from the ethers represented above, and the halogenated hydrocarbons are hydrocarbons, which are substituted with at least one chlorine atom.

As the hydrocarbons, $C_{5-15}$ linear or cyclic, saturated or unsaturated hydrocarbons are preferred, and n-pentane, 2-methylbutane, n-hexane, 2-methylpentane, 2,2-dimethylbutane, 2,3-dimethylbutane, n-heptane, 2-methylhexane, 3-methylhexane, 2,4-dimethylpentane, n-octane, 2-methylheptane, 3-methylheptane, 4-methylheptane, 2,2-dimethylhexane, 2,5-dimethylhexane, 3,3-dimethylhexane, 2-methyl-3-ethylpentane, 3-methyl-3-ethylpentane, 2,3,3-trimethylpentane, 2,3,4-trimethylpentane, 2,2,3-trimethylpentane, 2-methylheptane, 2,2,4-trimethylpentane, n-nonane, 2,2,5-trimethylhexane, n-decane, n-dodecane, cyclopentane, methylcyclopentane, cyclohexane, methylcyclohexane, ethylcyclohexane or bicyclohexane may, for example, be mentioned. Among them, a $C_{5-7}$ hydrocarbon such as n-pentane, cyclopentane, n-hexane, cyclohexane or n-heptane is preferred.

As the alcohols, $C_{1-16}$ linear or cyclic alcohols are preferred, and methanol, ethanol, n-propyl alcohol, isopropyl alcohol, n-butyl alcohol, sec-butyl alcohol, isobutyl alcohol, tert-butyl alcohol, 1-pentyl alcohol, 2-pentyl alcohol, 1-ethyl-1-propyl alcohol, 2-methyl-1-butyl alcohol, 3-methyl-1-butyl alcohol, 3-methyl-2-butyl alcohol, neopentyl alcohol, 1-hexyl alcohol, 2-methyl-1-pentyl alcohol, 4-methyl-2-pentyl alcohol, 2-ethyl-1-butyl alcohol, 1-heptyl alcohol, 2-heptyl alcohol, 3-heptyl alcohol, 1-octyl alcohol, 2-octyl alcohol, 2-ethyl-1-hexyl alcohol, 1-nonyl alcohol, 3,5,5-trimethyl-1-hexyl alcohol, 1-decyl alcohol, 1-dodecyl alcohol, cyclohexyl alcohol, 1-methylcyclohexyl alcohol, 2-methylcyclohexyl alcohol, 3-methylcyclohexyl alcohol, 4-methylcyclohexyl alcohol, α-terpineol, 2,6-dimethyl-4-heptyl alcohol, 1-tetradecyl alcohol, ethylene glycol, diethylene glycol or propylene glycol may, for example, be mentioned. Among them, an alkyl alcohol having at most 3 carbon atoms, such as methanol, ethanol or isopropyl alcohol is preferred.

As the ketones, $C_{3-9}$ linear or cyclic ketones are preferred, and specifically, acetone, methyl ethyl ketone, 2-pentanone, 3-pentanone, 2-hexanone, methyl isobutyl ketone, 2-heptanone, 3-heptanone, 4-heptanone, diisobutyl ketone, cyclohexanone, 2-methylcyclohexanone, 3-methylcyclohexanone, 4-methylcyclohexanone or acetophenone may, for example, be mentioned. Among them, a $C_{3-4}$ ketone such as acetone or methyl ethyl ketone is preferred.

As the halogenated hydrocarbons, $C_{1-6}$ saturated or unsaturated, chlorinated or chlorofluorinated hydrocarbons are preferred, and methylene chloride, 1,1-dichloroethane, 1,2-dichloroethane, 1,1,2-trichloroethane, 1,1,1,2-tetrachloroethane, 1,1,2,2-tetrachloroethane, pentachloroethane, 1,1-dichloroethylene, cis-1,2-dichloroethylene, trans-1,2-dichloroethylene, trichloroethylene, tetrachloroethylene, 1,2-dichloropropane, 1,1-dichloro-2,2,3,3,3-pentafluoropropane (HCFC-225ca), 1,3-dichloro-1,1,2,2,3-pentafluoropropane (HCFC-225cb), 1,1-dichloro-1-fluoroethane (HCFC-141b) or decafluoropentane may, for example, be mentioned. Among them, a $C_{1-2}$ chlorinated hydrocarbon such as methylene chloride, trichloroethylene or tetrachloroethylene, HCFC-225ca, HCFC-225cb or HCFC-141b is preferred.

As the ethers, $C_{2-8}$ linear or cyclic ethers are preferred, and diethyl ether, dipropyl ether, diisopropyl ether, dibutyl ether, ethyl vinyl ether, butyl vinyl ether, anisole, phenetole, 4-methyl anisole, dioxane, furan, 2-methylfuran or tetrahydrofuran may, for example, be mentioned. Among them, a $C_{4-6}$ ether such as diethyl ether, diisopropyl ether, dioxane or tetrahydrofuran is preferred.

As the esters, $C_{2-19}$ linear or cyclic esters are preferred, and specifically, methyl acetate, ethyl acetate, propyl acetate, isopropyl acetate, butyl acetate, isobutyl acetate, sec-butyl acetate, pentyl acetate, (3-methoxy)butyl acetate, sec-hexyl acetate, 2-ethylbutyl acetate, 2-ethylhexyl acetate, cyclohexyl acetate, benzyl acetate, methyl propionate, ethyl propionate, butyl propionate, ethyl 2-hydroxy-2-methyl propionate, diethyl phthalate or dibutyl phthalate may, for example, be mentioned. Among them, a $C_{3-4}$ ester such as methyl acetate or ethyl acetate is preferred.

The glycol ethers are preferably glycol ethers having a hydrogen atom of one or both of hydroxyl groups of a dimer to tetramer of a $C_{2-4}$ dihydric alcohol substituted by a $C_{1-6}$ alkyl group, and specifically, such glycol ethers are ethylene glycol monomethyl ether, ethylene glycol monoethyl ether, ethylene glycol monoisopropyl ether, ethylene glycol monobutyl ether, ethylene glycol monohexyl ether, ethylene glycol dimethyl ether, ethylene glycol diethyl ether, ethylene glycol dibutyl ether, ethylene glycol monomethoxymethyl ether, diethylene glycol monomethyl ether, diethylene glycol monoethyl ether, diethylene glycol monobutyl ether, diethylene glycol dimethyl ether, diethylene glycol ethylmethyl ether, diethylene glycol diethyl ether, diethylene glycol dibutyl ether, propylene glycol monomethyl ether, propylene glycol monoethyl ether, propylene glycol monobutyl ether, dipropylene glycol monomethyl ether, dipropylene glycol monoethyl ether, dipropylene glycol monopropyl ether and dipropylene glycol monobutyl ether.

The mixed solvent composition of the present invention preferably contains a $C_{1-3}$ alcohol, especially ethanol or isopropyl alcohol, whereby the cleaning performance can be improved, and additionally, it can be used in an application of so-called dewatering/drying to remove water from an article to the surface of which water is attached. Further, in a case where the mixed solvent composition containing a $C_{1-3}$ alcohol can form an azeotropic composition or azeotrope-like composition, it is preferred to select a compositional ratio suitable for forming the azeotropic solvent composition or the azeotrope-like solvent composition.

Further, primarily in order to increase the stability, one or more of the following compounds may be contained in the azeotrope-like solvent composition or the mixed solvent composition in the amount of compounds from 0.001 to 5 mass %.

The compound to be contained may, for example, be a nitro compound such as nitromethane, nitroethane, nitropropane or nitrobenzene; an amine such as diethylamine, triethylamine, isopropylamine, diisopropylamine or n-butylamine; a phenol such as phenol, o-cresol, m-cresol, p-cresol, thymol, p-t-butylphenol, t-butyl catechol, catechol, isoeugenol, o-methoxyphenol, bisphenol A, isoamyl salicylate, benzyl salicylate, methyl salicylate or 2,6-di-t-butyl-p-cresol; and a triazole such as 2-(2'-hydroxy-5'-methylphenyl)benzotriazole, 2-(2'-hydroxy-3'-t-butyl-5'-methylphenyl)-5-chlorobenzotriazole, 1,2,3-benzotriazole or 1-[(N,N-bis-2-ethylhexyl)aminomethyl]benzotriazole.

As materials of articles to be cleaned by using the azeotrope-like solvent composition or the mixed solvent composition of the present invention, glass, ceramics, elastomer or metal may, for example, be mentioned in addition to a plastic such as an acrylic resin. Further, specific examples of the above articles, may be electronic instruments, electrical instruments, precision machines, precision instruments, optical articles, etc., or their components such as ICs, micromotors, relays, bearings, optical lenses, glass substrates, etc.

As soils to be removed by using the azeotrope-like solvent composition or the mixed solvent composition of the present invention, soils attached at the time of producing an article or a part constituting the article, which has to be removed ultimately, may be mentioned, and specifically contaminants such as some oils, dusts, particles and resin shavings may, for example, be mentioned. Further, by using the azeotrope-like solvent composition or the mixed solvent composition of the present invention, it is possible to remove droplets of a solvent having a high surface tension and a small specific gravity, water droplets, etc.

In order to remove such soils, it is effective to bring each solvent composition of the present invention into contact with the surface of an article to be cleaned. As a specific method, hand wiping, dip cleaning, spray cleaning, immersion-oscillation cleaning, immersion-ultrasonic cleaning, vapor cleaning or a combination thereof can, for example, be utilized.

EXAMPLES

Measurement of Vapor-Liquid Equilibrium 300 g of a solvent composition obtained by mixing HFE-347 and PF-5060 (perfluorohexane, trade name of Sumitomo 3M Limited) at various weight ratios was put in an Othmer vapor-liquid equilibrium still, and distillation was carried out at atmospheric pressure from $9.96\times10^4$ to $1.02\times10^5$ Pa. At the time when the temperatures of the gas phase and the liquid phase reached equilibrium, samples of the solvent composition from the gas phase and the liquid phase were obtained, and then the compositions of HFE-347 and PF-5060 were analyzed by gas chromatography. As a result, the compositions of the gas phase and the liquid phase were equal in amounts of HFE-347=39.5 mass % and PF-5060=60.5 mass % at atmospheric pressure ($1.011\times10^5$ Pa). The temperature of the gas phase was 47.6° C.

(Confirmation Test for Effect on Acrylic Resin)

In accordance with the following method, an effect of the solvent composition on an acrylic resin was tested. Examples 1 to 3 are examples of the present invention, and Example 4 is a comparative example.

As indicated in Table 1, solvent compositions comprising HFE-347 and PF-5060 (Examples 1 to 4) were prepared. Then, a test coupon 25 mm×30 mm×2 mm in size with a hole 6 mm in diameter made of an acrylic resin (Acrylite L, trade name of Mitsubishi Rayon Co., Ltd.) was immersed in 100 mL of each solvent composition at room temperature (21° C.) for 1 minute and taken out, and its appearance was observed. The results are shown in Table 1. In Table 1, 0 indicates that substantially no change was observed, and 1 indicates that cracking was observed at the periphery of the hole.

TABLE 1

| Example | Solvent composition (mass ratio) | Effect on acrylic resin |
|---|---|---|
| 1 | HFE-347 (30)/PF-5060 (70) | 0 |
| 2 | HFE-347 (40)/PF-5060 (60) | 0 |
| 3 | HFE-347 (60)/PF-5060 (40) | 0 |
| 4 | HFE-347 (70)/PF-5060 (30) | 1 |

<Confirmation Test for Effect on Flexible Polyvinyl Chloride Resin>

In accordance with the following method, an effect of the solvent composition on a flexible polyvinyl chloride resin was tested. Examples 5 to 7 are examples of the present invention, and Example 8 is a comparative example.

As indicated in Table 2, solvent compositions comprising HFE-347 and PF-5060 (Examples 5 to 7) and a composition comprising HFE-347 (Example 8) were prepared. Then, a test coupon 25 mm×30 mm×2 mm in size with a hole 6 mm in diameter made of a flexible polyvinyl chloride resin (Toughnyl, trade name of Japan Wavelock Co., Ltd.) was immersed in 100 mL of each solvent composition at the boiling point (56° C.) for 3 days and taken out, and its appearance was observed. The results are shown in Table 2. In Table 2, 0 indicates that substantially no change was observed, and 1 indicates that white discoloration was observed on the entire test coupon.

TABLE 2

| Example | Solvent composition (mass ratio) | Effect on flexible polyvinyl chloride resin |
|---|---|---|
| 5 | HFE-347 (30)/PF-5060 (70) | 0 |
| 6 | HFE-347 (40)/PF-5060 (60) | 0 |
| 7 | HFE-347 (60)/PF-5060 (40) | 0 |
| 8 | HFE-347 (100) | 1 |

<Cleaning Rest for Degreasing>

In accordance with the following method, a test for cleaning oils was carried out by using the solvent composition. Examples 9 and 10 are examples of the present invention, and Examples 11 to 13 are comparative examples.

A surface of a test coupon 50 mm×50 mm×2 mm in size made of iron (SPCC-SB) was uniformly coated with 0.3 g of Panasate 810 (trade name of NOF Corporation) as grease, and the test coupon was immersed in each solvent composition as indicated in Table 2 at 40° C. for 1 minute, then, immersed in the solvent composition having the same composition at 25° C. for 1 minute, and further exposed to vapor of the solvent composition for 1 minute, which was produced by heating, to dry. Meanwhile, HFE-7100 used in Example 13 is $C_4F_9OCH_3$ manufactured by Sumitomo 3M Limited.

The test coupon was weighed at the beginning and the end of the test, and the amount of remaining grease on the test coupon and removal ratio of grease were calculated. The results are shown in Table 3.

TABLE 3

| Example | Solvent composition (mass ratio) | Amount of attached grease (mg) | Removal ratio (%) | Outer appearance |
|---|---|---|---|---|
| 9 | HFE-347 (40)/ PF-5060 (60) | <3 | >99 | Good |
| 10 | HFE-347 (30)/ PF-5060 (70) | <3 | >99 | Good |
| 11 | HFE-347 (20)/ PF-5060 (80) | 15 | 95 | Grease partially attached |
| 12 | PF-5060 (100) | 81 | 73 | Grease entirely attached |
| 13 | HFE-7100 (100) | 45 | 85 | Grease entirely attached |

<Particle Removal Test>

In accordance with the following method, a particle removal test was carried out by using the solvent composition. Examples 14 to 16 are examples of the present invention.

On the surface of a test coupon 30 mm×25 mm×2 mm in size with a hole 6 mm in diameter made of a low-pressure polyethylene, fine particles about 3 mg in weight obtained by finely grinding the same material constituting the test coupon were uniformly sprinkled. The test coupon was immersed in each solvent composition as indicated in Table 4 at 40° C. for 1 minute with applying 40 kHz and 200 W ultrasonic waves, then, immersed in the solvent composition having the same composition at 25° C. for 1 minute, and further exposed to vapor of the solvent composition for 1 minute, which was produced by heating, to dry.

The test coupon after the test was visually observed, and the presence or absence of the remaining fine particles on the surface of the test coupon was confirmed. The results are shown in Table 4.

TABLE 4

| Example | Solvent composition (mass ratio) | Presence or absence of particles |
|---|---|---|
| 14 | HFE-347 (30)/PF-5060 (70) | Absence |
| 15 | HFE-347 (40)/PF-5060 (60) | Absence |
| 16 | HFE-347 (60)/PF-5060 (40) | Absence |

<Dewatering Test for Drying>

In accordance with the following method, a dewatering test for drying was carried out by using the solvent composition. Examples 17 and 18 are examples of the present invention.

A mixed solution was prepared by adding 5 parts by mass of ethanol to 100 parts by mass of each solvent composition as indicated in Table 5.

A glass plate 50 mm×50 mm×2 mm in size preliminarily cleaned with a water-based cleaning agent and pure water was immersed in pure water, then, immersed in each mixed solution at 40° C. for 1 minute with applying 40 kHz and 200 W ultrasonic waves, and further exposed to vapor of the solvent composition for 1 minute, which was produced by heating, to rinse and to dry.

The test coupon after the test was visually observed, and the presence or absence of remaining water on the surface of the test coupon was confirmed. The results are shown in Table 5.

TABLE 5

| Example | Solvent composition (mass ratio) | Presence or absence of water |
|---|---|---|
| 17 | HFE-347 (40)/PF-5060 (60) | Absence |
| 18 | HFE-347 (30)/PF-5060 (70) | Absence |

INDUSTRIAL APPLICABILITY

The solvent compositions of the present invention are useful for removing soils such as dusts or oils attached to the surface of articles such as electronic components such as IC, precision mechanical parts, glass substrates, molded-resin parts, etc., especially articles, of which at least the surface is made of an acrylic resin.

The entire disclosure of Japanese Patent Application No. 2004-292618 filed on Oct. 5, 2004 including specification, claims and summary are incorporated herein by reference in its entirety.

What is claimed is:

1. An azeotrope-like solvent composition comprising from 38 to 41 mass % of (2,2,2-trifluoroethoxy)-1,1,2,2-tetrafluoroethane and from 59 to 62 mass % of perfluorohexane.

2. A mixed solvent composition comprising from 30 to 60 mass % of (2,2,2-trifluoroethoxy)-1,1,2,2-tetrafluoroethane and from 40 to 70 mass % of perfluorohexane.

3. A method of cleaning an article to be cleaned, which comprises bringing the solvent composition as defined in claim 1 into contact with the surface of the article to remove soils attached to the article.

4. A method of dewatering an article to be cleaned, which comprises bringing the solvent composition as defined in claim 1 into contact with the surface of the article to remove water attached to the article.

5. The method of cleaning an article to be cleaned according to claim 3, wherein the soils are oils.

6. The method of cleaning an article to be cleaned according to claim 3, wherein the article is made of an acrylic resin.

7. The method of dewatering an article to be cleaned according to claim 4, wherein the article is made of an acrylic resin.

* * * * *